Feb. 25, 1930.　　　J. E. GLOEKLER　　　1,748,123
STEAM COOKER
Filed March 6, 1928　　2 Sheets-Sheet 1
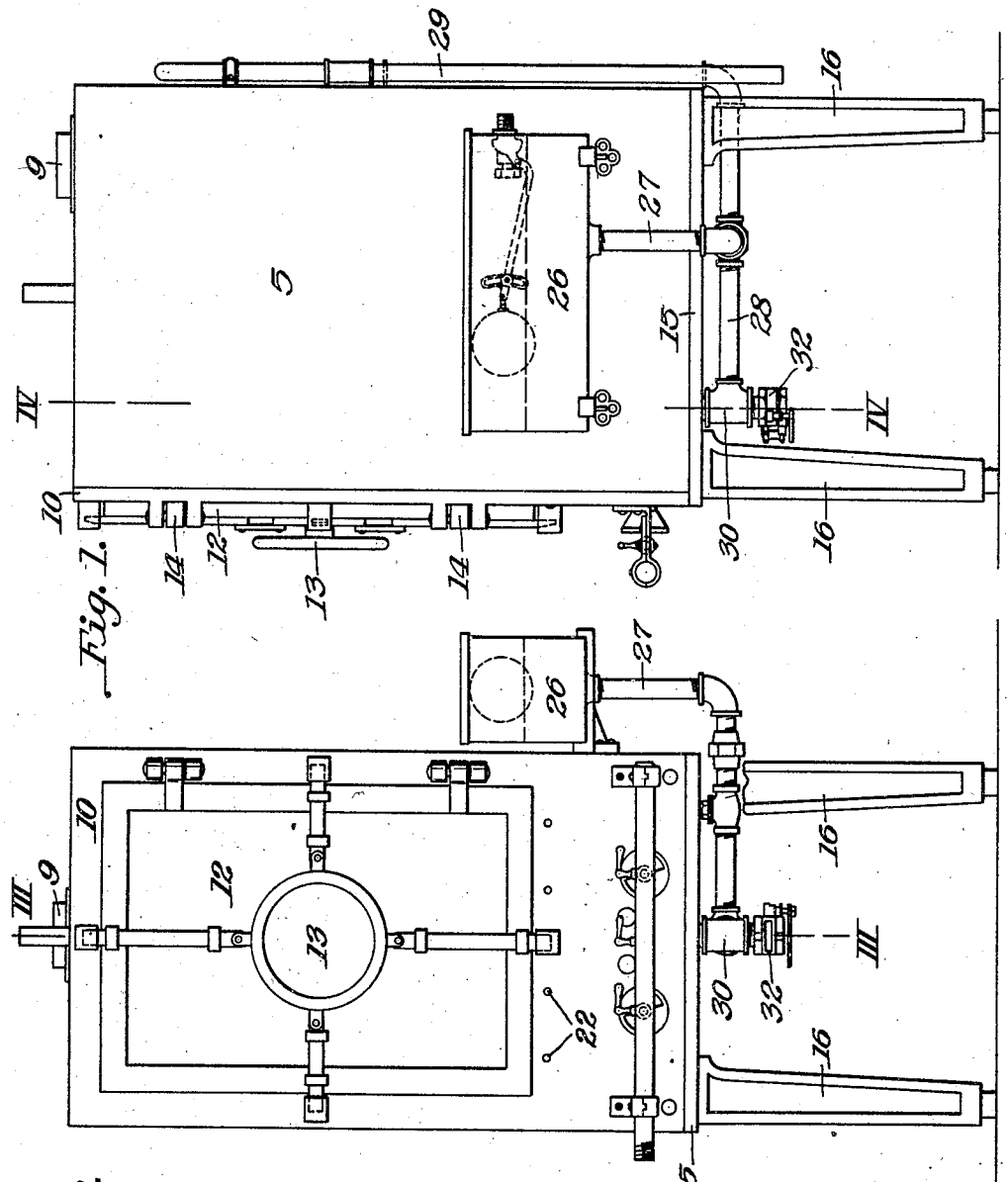

Feb. 25, 1930.   J. E. GLOEKLER   1,748,123
STEAM COOKER
Filed March 6, 1928    2 Sheets-Sheet 2
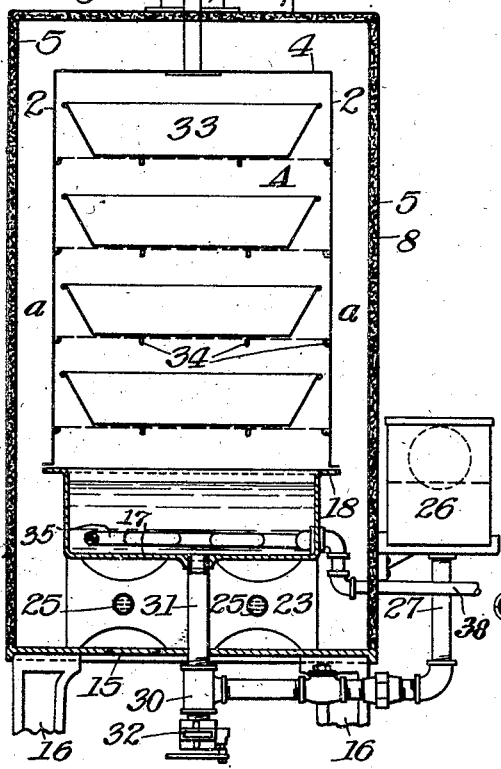
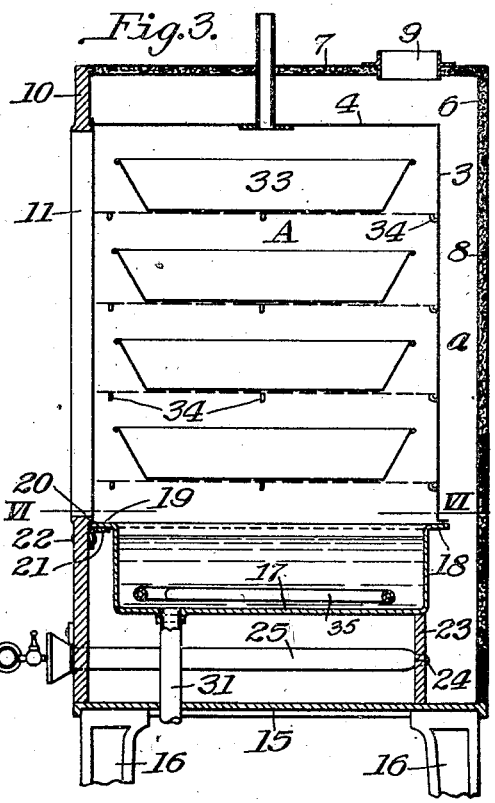
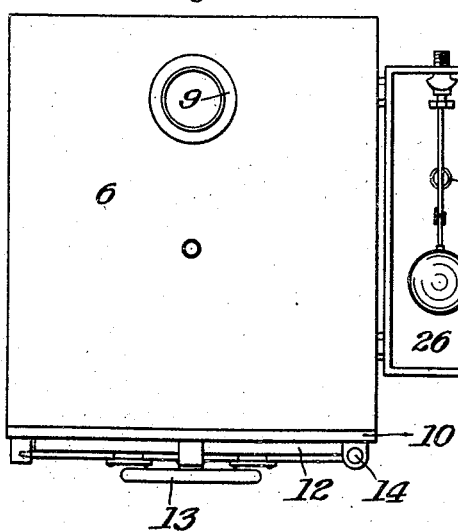
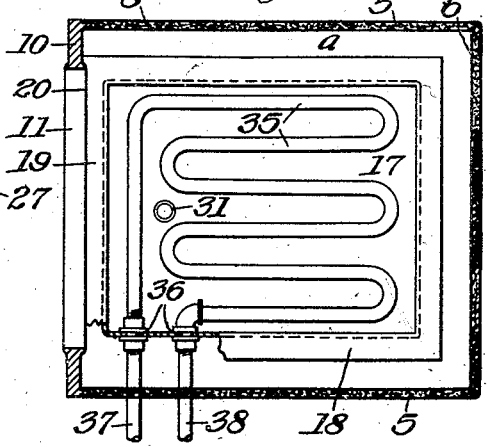
INVENTOR
John Edward Gloekler
by C. M. Claire
Attorney Patented Feb. 25, 1930

1,748,123

UNITED STATES PATENT OFFICE

JOHN EDWARD GLOEKLER, OF PITTSBURGH, PENNSYLVANIA

STEAM COOKER

Application filed March 6, 1928. Serial No. 259,443.

My invention refers to an improvement in steam cookers.

It has for its object to provide an article or machine of such kind adapted to cook articles of food by application of steam directly in the form of an internally generated surrounding vapor.

Generally stated, it consists of a double wall casing provided with a water containing bath at the base, associated means for directly heating the water, means for regulating the water supply, and for carrying off the vapor, and other features of construction and operation, as hereinafter more fully described.

Heretofore, some cookers utilizing steam have operated in connection with an outside supply of generated steam, and the general operation of cooking or carrying on other similar operations by application of steam heat is not, therefore, broadly new.

The present improvement relates to a modified construction of water-containing base and its mounting within the outer surrounding wall, of insulating construction, an improved piping system for water supply and drainage, a modified heating arrangement for the vaporizing water, etc.

The present improvements are in connection with a steam cooker generally similar to that of my prior Patent No. 1,610,944 of December 14, 1926.

In the drawings, illustrating the invention:

Fig. 1 is a view of the cooker in side elevation;

Fig. 2 is a similar view in front elevation;

Fig. 3 is a vertical sectional view on the line III—III of Fig. 2;

Fig. 4 is a similar section at right angles thereto on the line IV—IV of Fig. 3;

Fig. 5 is a top plan view of Fig. 2; and

Fig. 6 is a cross section on the line VI—VI of Fig. 3, showing a modified water heating arrangement utilizing a circulating steam pipe.

In the drawings, the cooking chamber or compartment is enclosed within an inner casing composed of side walls 2, a back wall 3 and a top 4 of suitable material, as sheet or plate metal. Such casing is connected at the bottom with the separate cast metal basin hereinafter described, and is enclosed within an outer casing composed of side walls 5, a back wall 6, and a top 7. The side and back walls 5 and 6, as shown, are composed of inner and outer sheet metal sections filled with any suitable insulating material, at 8, for the purpose of economical retention of the heat. The top 7, which may be of a single section of sheet metal, is provided with an outlet vent pipe or flue connection 9.

The front wall 10 of the cooker is preferably made of a casting having the front opening 11 for the opening and closing door 12, which is mounted thereon and provided with suitable locking and unlocking mechanism, as a middle wheel 13 and holding bolts, with the customary supporting hinges 14 at one side.

The side walls 5 make tight connection with the front wall 10 at the corners, and the front wall, side walls and rear wall are mounted upon a transverse supporting base 15 preferably of cast metal, carried upwardly above the floor by suitable supporting legs 16.

The cast metal base or basin 17 forms a lower continuation or extension of the inner cooking chamber lining members 2—3, and is connected therewith by flange joints 18 along the sides and rear, the front portion of the cooking chamber being open and forming an inward extension of opening 11 through the main front wall of the apparatus.

The flange connections 18 are preferably provided with an intervening packing strip of any suitable material, as asbestos or the like, for tight connection, whereby the entire interior of the cooker is isolated from the circulating space $a$, between the inner cooker chamber wall and the outer main casing walls 5 and 6.

The cast metal base 17 is provided at its front with a forwardly extending flange 19 projecting against the front wall and slightly underneath an inner lip 20 thereof, surrounding the door opening at the inner and outer edges thereof, and providing a framing for the door opening.

Flange 19 rests upon a transverse angle 21 secured by rivets 22 against the front wall, whereby the front portion of the basin 17 is snugly and fixedly held in position, avoiding any leakage spaces, and effecting a continuous surface connection with the front wall as well as with the side walls 2—3 of the inner lining.

The rear end portion of the basin is supported on base 15 by an intervening bracket 23, into which extends the closed ends 24 of the burner pipes 25. The basin 17 is in communication with a water supply tank 26 by means of a pipe 27 leading from the bottom of the tank across underneath to a pipe 28 communicating at one side with a gooseneck extenison 29 and at the other side with a common supply and exhaust fitting 30. A pipe 31 extends upwardly therefrom through the front bottom portion of basin 17 for supply of water thereto up to the desired level, as regulated by the trap-controlled water supply tank 26, similar to that of my prior patent above referred to.

An outlet valve 32 below fitting 30 provides for withdrawal of water or sediment from the basin 17 from time to time, as desired. The inner casing 2—3 encloses the cooking compartment A in which food is placed in any suitable vessels, as trays 33, resting on supporting shelves carried by supporting abutments 34 at any desired levels. The shelves are preferably of articulated construction, as wire, for transverse circulation of the steam.

Ordinarily, the water in basin 17 is heated by combustion of gas furnished by burner pipes 25 having the usual mixers, controlling valves, supply connection, etc., at the front of the machine, as shown.

In Fig. 6, I show a modified means for heating the water in basin 17, consisting of an inner coil or circulating pipe 35, the terminals of which are connected through the side wall of the basin, as at 36, with an inlet and an outlet steam pipe 37—38, whereby steam circulation may be introduced for heating in substitution of the combustion fuel.

The general construction and operation of the invention will be readily understood and appreciated from the foregoing description. A particular advantage in connection with the cast metal basin made and incorporated as shown is that it provides a strong, rigid, water-containing bottom for the interior cooking chamber, possessing several advantages over the sheet metal base as previously used.

It is capable of rigid and positive connection and mounting within the outer casing walls; it is strong and sanitary, avoiding any right angled corners, by reason of the curved construction at the bottom, giving a continuous easily enameled surface of sanitary character. It facilitates the various pipe and other connections, and constitutes a strong, continuously serviceable element of the entire construction.

It will be understood that the door 12 makes a tight fitting connection with the front frame 10, completely closing the opening therethrough, whereby the entire interior is tightly closed, avoiding any escape of odor or vapor, and is otherwise extremely convenient and practicable in construction and operation.

The invention may be changed or varied in specific features or details by the skilled mechanic, but all such changes are to be understood as within the scope of the following claim.

Having described my invention, what I claim is:

A steam cooker consisting of an outer casing having a front door opening, an uppermost outlet flue and a lower heat generating compartment, a heater in said compartment, an inner casing spaced inwardly from the sides, back and top of the outer casing providing a surrounding gas circulation conduit and terminating at the front against the front wall of the outer casing around the door opening, said inner casing having at its base a water containing basin of cast metal forming a downward extension thereof and provided with a pipe leading upwardly through its bottom forming a common water supply and exhaust conduit, and a steam heating circulating pipe within the basin having supply and return conections extending through the outer wall and the side wall of the basin.

In testimony whereof I hereunto affix my signature.

JOHN EDWARD GLOEKLER.